United States Patent Office 3,709,990
Patented Jan. 9, 1973

3,709,990
METHOD OF INDUCING SIMULTANEOUS MOUNTING OF SILKWORMS
Masaki Kamada and Tetsuo Okauchi, Osaka, Japan, assignors to Takeda Chemical Industries, Ltd., Osaka, Japan
No Drawing. Continuation-in-part of application Ser. No. 688,001, Dec. 5, 1967. This application May 19, 1970, Ser. No. 38,897
Int. Cl. A61k *17/00*
U.S. Cl. 424—243
16 Claims

ABSTRACT OF THE DISCLOSURE

Simultaneous mounting of silkworms and corresponding improvement of quality of cocoons are achieved by feeding the silkworms a diet containing about 5 to 20 gammas per gram of compound(s) of the formula

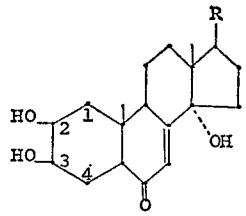

wherein the 2- and 3-positioned OH groups are α- or β-oriented, and R is 1,5-dimethylhexyl substituted by 2 to 4 OH groups, or alkanoate(s) thereof with at most 4 carbon atoms, severally or in admixture.

---

This is a continuation-in-part application of applicants' copending application Ser. No. 688,001, filed Dec. 5, 1967 and now abandoned.

This invention relates to a method for inducing simultaneous mounting of silkworms, and also relates to artificial feedstuff therefor.

When silkworms are reared by hitherto known feedstuffs, their starting of mounting does not always occur simultaneously and, as a result, the produced cocoons are hardly of homogeneous quality.

Further, the time lag in mounting has been a stumbling block to economy of man-power and to realization of mechanized sericulture.

The object of this invention is, therefore, a method for inducing simultaneous mounting. Another object of this invention is to provide a new artificial feedstuff by which simultaneous mounting of silkworms is induced.

The principal object is realized by feeding silkworms of the fifth instar on a compound of the formula:

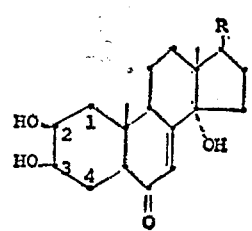

(wherein the two hydroxyls at positions 2 and 3 are α- or β-oriented, R is 1,5-dimethylhexyl having 2 to 4 hydroxyl groups) or on a mixture of such compounds (I), in admixture with the silkworm feedstuff.

The compounds of the Formula I may be added to the feedstuff in the form of alkanoates thereof, having at most 4 carbon atoms (e.g. formates, acetates, etc.), or in a crude form containing the said compounds (e.g. extract, dried raw materials as detailed hereinafter), and can also be added either in the form of a solution or in the solid form.

These compounds have been known as moulting hormones, and their administration has been effected by injection, but there has been no information in regard to their effect on simultaneous mounting of silkworms and the fact that such effect can be brought about through oral administration.

As advantageously employed and easily available compounds of the Formula I, there are exemplified:

2β,3β,14α,20,22-pentahydroxycholest-7-en-6-one;
2α,3α,14α,20,22-pentahydroxycholest-7-en-6-one;
2β,3β,14α,20,22,24-hexahydroxycholest-7-en-6-one;
2β,3β,14α,22,25-pentahydroxycholest-7-en-6-one;
2β,3β,14α,20,22,25-hexahydroxycholest-7-en-6-one;
2β,3β,14α,20,22,26-hexahydroxycholest-7-en-6-one;
2β,3β,14α,20,22,25,26-heptahydroxycholest-7-en-6-one.

These compounds are obtained, for example, from such plants as *Podocarpus Nakaii, Podocarpus macrophyllus, Podocarpus chinensis, Achyranthes japonica Nakaii, Achyranthes radix, Achyranthes longifolia Makino, Taxus cuspidata, Ajuga documbens, Ajuga nipponensis, Ajuga incisa, Ajuga japonica* Miq., *Ajuga shikotanensis* Miyabe et Tatewaki, *Ajuga yesoensis* Maxim, *Stachyurus praecox, Helleborus niger, Polypodium japonicum, Polypodium niponium* Mett, *Struthiopteris niponica, Dryopteris Thelypteris, Lychnis Miqueliana, Dryopteris Thelypteris* A. Gray, *Lychnis Miqueliana* Rohrb., *Cyprus rotundus* L, *Siler divaricatum* Benth et Hook fil, *Siler Libanoitus, Gardenia jasminoides* Ellis f. *grandiflora* Makino, *Alisma Plantago-aquatica* L. var. *orientile* Samuels, *Glycyrrhiza glabra* L, *Gledtschia japonica* Miq., *Digenea simplex* C. Agardh., *Inula japonica* Thunb., *Vitex magapotamica* Moldenke.

The nomenclature of the above-enumerated plants is in accordance with the new plant picture book edited by Makino (published by Hokuryukan in 1951).

These raw materials contain the aforementioned compounds solely or as a mixture thereof in a concentration of about 0.005 to 0.5% by weight on the dry basis.

The compounds of the Formula I are easily isolated from the raw materials. For example, 2β,3β,14α,20,22-pentahydroxycholest-7-en-6-one is extracted from *Podocarpus Nakaii* leaves with alcohol. After distilling off the solvent, the substance is extracted again from the resultant solution with chloroform, folowed by chromatography on silica gel. The objective compound is recovered as crystals from methanol solution of the obtained eluate. M.P. 259–260° C.; [α]$_D^{15}$=+91° (0.101% MeOH).

In analogous manner, the other aforementioned compounds I are obtained from raw materials.

The aforesaid acylates are easily synthesized by subjecting the corresponding starting materials to acylation in per se conventional manner; cf. U.S. Pat. No. 3,271,250.

There may be employed various kinds of components for feedstuff, including the said compounds and other additives.

One of the compounds I or a mixture thereof is added to feedstuff in such amount that the concentration of the said compounds is from about 5 to about 20 gammas per gram of the feedstuff on the dry basis.

As the concentration of the compounds I in the feedstuff exceeds 20 gammas, the obtained cocoons become less in quantity and inferior in quality.

As the composition of feedstuff, there may be exemplified: diluting and nourishing materials such as agar, carboxymethyl cellulose, methyl cellulose, alginic acid, soy bean meal, soy bean flour, defatted soy bean meal, soy bean-curd refuse, soy bean curd, fermented soy beans, dried fermented soy bean meal, defatted dry bean paste, rice flour, wheat meal, processed grain flour, sugars (e.g. sucrose, glucose, lactose, raffinose, fructose), straw ash, yeast or its processed matter, fish meal, etc. These also serve as carrier. Further, there may be exemplified the following nutritious components for the growth of silkworms: amino acids such as glutamic acid, aspartic acid, leucine, lysine, tyrosine, tryptophan, valine, threonine, serine, proline, glycine, alanine, isoleucine, phenylalanine, arginine, methionine and salts thereof; animal or plant proteins; vitamins such as pantothenic acid, nicotinic acid, vitamin $B_1$, vitamin $B_2$, vitamin $B_6$, vitamin $B_{12}$, vitamin C, vitamin D, biotin, folic acid, vitamin K, vitamin E, vitamin P, inositol, orotic acid, lipoic acid; nucleic acid and its related compounds such as adenylic acid, guanylic acid, uridylic acid, cytidylic acid, inosinic acid, desoxyadenylic acid, thymidylic acid, adenine, guanine, cytosine, hypoxanthine; inorganic salts such as sodium phosphate, sodium dihydrogen phosphate, dipotassium hydrogen phosphate, potassium dihydrogen phosphate, magnesium phosphate, ammonium dihydrogen phosphate, sodium carbonate, sodium hydrogen carbonate, potassium carbonate, sodium chloride, potassium chloride, calcium chloride, polyphosphoryl salt; honey or its processed matter; enzymes such as diastase, papain, trypsin; antiseptic substances such as formaldehyde, sodium dehydrogenacetate, vitamin $K_3$, sodium sorbate; antibiotics and sulfa drugs such as tetracycline, chlortetracycline, oxytetracycline, neomycin, dextromycin, kanamycin, triochomycin, mikamycin, penicillin, sulfisomidine, sulfisoxazole, metoxypyridazine, particularly streptomycin, dihydrostreptomycin, streptothricin, chloramphenicol, oleandomycin, leucomycin, erythromycin, picromycin; chemicals such as nitrofuryl acrylic amide, hinokitiol, furazolidone, nitrofurasone, butyl p-hydroxybenzoate, propyl-hydroxybenzoate; others such as glucuronic acid or salt thereof (ethyl glucuronate, etc.), glucuronic acid amide, 2 - amino-2-desoxy-D-glucuronic acid or salt thereof; N-glucuronosideglucosamine or salt thereof; chlorogenic acid, resorcylic acid, gentisic acid, homogentisic acid, piperic acid, gallic acid, caffeic acid, or salts or esters thereof; quinic acid, gulonic acid, shikimic acid, or salts or esters thereof; polyphenols (e.g. vanillin, protocatechualdehyde), etc.

The following examples are merely for illustrative purposes, and are not intended to be construed as limitations of the present invention.

EXAMPLE 1

Following artificial feedstuff is employed:

Basal components: Part(s) by weight
Mulberry leaf powder _____ 20.0
Defatted soy bean meal _____ 15.0
Cellulose powder _____ 35.0
Potato starch _____ 15.0
β-sitosterol _____ 1.5
Wesson's salt mixture [1] _____ 1.0
Vitamin mixture [2] _____ trace
Sucrose _____ 10.0
Vitamin C _____ trace
Inositol _____ 0.5
Dipotassium hydrogen phosphate _____ 0.5
Choline chloride _____ 0.05
Dihydrostreptomycin _____ 0.1

Water: 1.6 times as much by volume as all the other components.

[1] Composition:
NaCl _____ 0.105
KCl _____ 0.120
$KH_2PO_4$ _____ 0.310
$Ca_3(PO_4)_2$ _____ 0.149
$CaCO_3$ _____ 0.210
$MgSO_4$ _____ 0.090
$FePO_4.4H_2O$ _____ 0.0147
$MnSO_4$ _____ 0.0002
$K_2Al_2(SO_4)_4.24H_2O$ _____ 0.00009
$CuSO_4.5H_2O$ _____ 0.00039
NaF _____ 0.00057
KI _____ 0.00005

[2] A mixture of biotin 0.2 mg., calcium pantoate 2.0 mg., folic acid 0.2 mg., nicotinic amide 2.0 mg., vitamin $B_6$ 1.0 mg., vitamin $B_2$ 1.0 mg., vitamin $B_1$ 1.0 mg., vitamin C 39.16 mg., and carnitine 1.0 mg. diluted to 1 gram with potato starch.

2β,3β,14α,20,22 - pentahydroxycholest - 7-en-6-one is added to the basal components. Thus-obtained feedstuff is fed to silkworms (race: Gunko x Banri) from the fourth day of the final instar. The time of mounting and spinning after the start of feeding is observed. The results are shown in Table 1. Hours in the tables in the following examples are those required for the silkworms to start mounting or spinning after the first feeding.

TABLE 1

| Run | Amount of addition, γ/100 g. of feedstuff | Number of silkworms | Mounting number after— | | | | Spinning number after— | |
|---|---|---|---|---|---|---|---|---|
| | | | 18 hours | 24 hours | 42 hours | 48 hours | 42 hours | 48 hours |
| Control | 0 | 40 | 2 | 9 | 22 | 29 | 3 | 6 |
| 1 | 4.8 | 40 | 0 | 4 | 11 | 40 | 4 | 4 |
| 2 | 24 | 40 | 0 | 6 | 40 | 40 | 6 | 29 |
| 3 | 120 | 40 | 8 | 36 | 40 | 40 | 30 | 40 |
| 4 | 600 | 40 | 22 | 40 | 40 | 40 | 40 | 40 |
| 5 | 3,000 | 40 | 40 | 40 | 40 | 40 | 40 | 40 |

EXAMPLE 2

2β,3β,14α,22,25-pentahydroxycholest - 7 - en-6-one (referred to as compound A, M.P. 235 to 237° C. $\alpha_D^{20}=+58.6°$) or 2β,3β,14α,20,22,25-hexahydroxycholest-7-en-one (referred to as compound B, M.P. 237.5 to 239.5° C, $[\alpha]_D^{28}=+63°$ (C=1.0 MeOH) was added to the basal components in Example 1.

Thus obtained artificial feedstuff is fed to silkworms (race: Gunko x Banri) from the fourth day of the final instar.

The time of mounting and spinning is observed and the results on Compounds A and B are shown in Table 2 and Table 3 respectively.

TABLE 2

| Run | Amount of addition, γ/100 g. of feedstuff | Number of silkworms | Mounting number after— | | | Spinning number after— | |
|---|---|---|---|---|---|---|---|
| | | | 24 hours | 42 hours | 48 hours | 42 hours | 48 hours |
| Control | 0 | 40 | 0 | 5 | 22 | 1 | 6 |
| 1 | 3.2 | 40 | 0 | 8 | 18 | 3 | 11 |
| 2 | 16 | 40 | 0 | 8 | 40 | 4 | 26 |
| 3 | 80 | 40 | 6 | 38 | 40 | 29 | 38 |
| 4 | 300 | 40 | 20 | 40 | 40 | 36 | 40 |
| 5 | 2,000 | 40 | 40 | 40 | 40 | 40 | 40 |

TABLE 3

| Run | Amount of addition, γ/100 g. of feedstuff | Number of silkworms | Mounting number after— | | | Spinning number after— | |
|---|---|---|---|---|---|---|---|
| | | | 24 hours | 42 hours | 48 hours | 42 hours | 48 hours |
| Control | 0 | 40 | 5 | 14 | 31 | 5 | 16 |
| 1 | 3.2 | 40 | 4 | 13 | 40 | 4 | 14 |
| 2 | 16.0 | 40 | 3 | 24 | 40 | 12 | 40 |
| 3 | 80 | 40 | 28 | 40 | 40 | 30 | 40 |
| 4 | 400 | 40 | 40 | 40 | 40 | 40 | 40 |
| 5 | 2,000 | 40 | 40 | 40 | 40 | 40 | 40 |

EXAMPLE 3

Dried root meal of *Achyranthes japonica* Nakaii is added to the basal components in Example 1.

Thus obtained artificial feedstuff is fed to silk worms (race: Gunko x Banri) from the fifth night of the final instar. The time of mounting and spinning is observed and the results are shown in Table 4.

TABLE 4

| Run | Amount of addition, γ/100 g. of feedstuff | Number of silkworms | Mounting number after— | | | | Spinning number after— | |
|---|---|---|---|---|---|---|---|---|
| | | | 18 hours | 24 hours | 42 hours | 48 hours | 42 hours | 48 hours |
| Control | 0 | 40 | 0 | 25 | 30 | 40 | 24 | 25 |
| 1 | 156 | 40 | 27 | 32 | 40 | 40 | 33 | 40 |
| 2 | 303 | 40 | 30 | 40 | 40 | 40 | 40 | 40 |
| 3 | 625 | 40 | 28 | 40 | 40 | 40 | 40 | 40 |
| 4 | 1,250 | 40 | 40 | 40 | 40 | 40 | 40 | 40 |
| 5 | 2,500 | 40 | 40 | 40 | 40 | 40 | 40 | 40 |

The dried root meal contains about 1000 p.p.m. of the compounds (I) on the dry basis.

EXAMPLE 4

1000γ of $2\beta,3\beta,14\alpha,20,22,24$ - hexahydroxycholest-7-en-6-one tetra acetate (M.P. 113–115° C.) is added to 100 grams of the basal components in Example 1.

Thus obtained artificial feedstuff is fed to silkworms (race: Gunko x Banri).

The silkworms are induced to mount in 16 hrs. after feeding, and the time course of spinning is observed to give the results shown in Table 5.

TABLE 5

| Run | Number of silkworms | Number of spinning worms after feeding for— | | | | | | | |
|---|---|---|---|---|---|---|---|---|---|
| | | 16 hours | 20 hours | 24 hours | 28 hours | 32 hours | 38 hours | 40 hours | 44 hours |
| Addition | 50 | 0 | 16 | 46 | 50 | | | | |
| No addition | 50 | 0 | 0 | 1 | 2 | 7 | 15 | 26 | 37 |

EXAMPLE 5

Crude root extract of *Achyranthes japonica* Nakaii is added to mulberry leaves, and thus obtained feedstuff is fed to silkworms (race: N124 x C124) on the eighth day of the final instar. The results are shown in Table 6.

EXAMPLE 6

Composition of basal feedstuff:

| | |
|---|---|
| Mulberry leaf powder | 20.0 |
| Defatted soybean meal | 35.0 |
| Cellulose powder | 15.0 |
| β-sitosterol | 0.5 |
| Sucrose | 10.0 |
| Ascorbic acid | 1.0 |
| Insositol | 0.5 |
| Dipotassium hydrogen phosphate | 0.5 |
| Vitamin B mixture | trace |
| Choline chloride | 0.5 |
| Dihydro-streptomycin | 0.1 |

Water: 1.6 times as much by volume as all the other components.

2000γ each of testing materials is added to 100 g. of the basal feedstuff, respectively. Thus obtained feedstuff is given to silkworms (race: Gunko x Banri) from the 6th day of the final instar for 12 hours.

Sixty silkworms are tested for each experiment. The number of mounting larvae is observed 12 hours after the start of feeding.

TABLE 6

| Run | Amount of addition, γ/100 g. of feedstuff | Number of silkworms | Mounting number after— | | | | | | Spinning number after— | | | | | |
|---|---|---|---|---|---|---|---|---|---|---|---|---|---|---|
| | | | 18 hours | 23 hours | 28 hours | 36 hours | 48 hours | 60 hours | 18 hours | 23 hours | 28 hours | 36 hours | 42 hours | 48 hours |
| Control | 0 | 30 | 2 | 7 | 9 | 30 | | | 0 | 0 | 6 | 8 | 22 | 27 |
| 1 | 201.6 | 30 | 13 | 30 | | | | | 0 | 9 | 25 | 29 | 30 | |
| 2 | 447.3 | 30 | 30 | | | | | | 0 | 23 | 29 | 29 | 30 | |
| 3 | 843.8 | 39 | 30 | | | | | | 0 | 27 | 30 | | | |
| 4 | 1,562.5 | 30 | 30 | | | | | | 0 | 28 | 29 | 29 | 30 | |
| 5 | 3,225.0 | 30 | 30 | | | | | | 0 | 27 | 30 | | | |

The results are shown in Table 7.

TABLE 7

| Testing materials: | Number of mounting larvae |
|---|---|
| Control | 1 |
| (1) Cholesterol | 0 |
| (2) β-sitosterol | 1 |
| (3) Ergosterol | 1 |
| (4) 14-desmethyl-lanosterol | 0 |
| (5) 4α-zymosterol | 2 |
| (6) Campesterol | 0 |
| (7) 2β,3β,14α,20,22 - pentahydroxycholest-7-en-6-one | 60 |
| (8) 2β,3β,14α,20,22,25 - hexahydroxycholest - 7-en-6-one | 60 |
| (9) 2β,3β,14α,20,22,26 - hexahydroxycholest - 7-en-6-one | 59 |

It is evident that the beneficial effect on the acceleration of mounting is not observed in the case of materials 1 to 6 added.

EXAMPLE 7

0, 125, 250, 500, 1000, 1500, 2000, 3000 and 5000γ of 2β,3β,14α,20,22 - pentahydroxycholest-7-ene-6-one are respectively added to the basal feedstuff in Example 6.

Thus obtained feedstuff is given to silkworms (race: Gunko X Banri) from the 4th day of the final instar.

Two hundred of silkworms are tested for each experiment.

The time of mounting and the quality and quantity of cocoons are observed.

The results are shown in Table 8.

TABLE 8

| Test | Amount of addition γ/100 g. feedstuff | Ratio of mounting larvae, percent, in— | | | Ratio of normal cocoon, percent |
|---|---|---|---|---|---|
| | | 12 hours | 18 hours | 24 hours | |
| Control | 0 | 13 | 32 | 55 | 100 |
| 1 | 125 | 15 | 39 | 62 | 98 |
| 2 | 150 | 38 | 66 | 87 | 99 |
| 3 | 500 | 89 | 95 | 100 | 100 |
| 4 | 1,000 | 91 | 99 | 100 | 100 |
| 5 | 1,500 | 95 | 98 | 100 | 100 |
| 6 | 2,000 | 97 | 99 | 100 | 100 |
| 7 | 3,000 | 98 | 100 | 100 | 93 |
| 8 | 5,000 | 98 | 100 | 100 | 87 |

EXAMPLE 8

2β, 3β,14α,20,22-pentahydroxycholest-7-en-6-one (compound A) and 2β,3β,14α,20,22,25-hexahydroxy cholest-7-en-6-one (compound B) are respectively added to the basal feedstuff of Example 6. Thus obtained feedstuff is given to silkworms (race: Gunko x Banri) of the 3rd day and 4th day of the final instar, respectively. The number of mounting larvae is observed 12 hours and 20 hours after the start of feeding. The results are shown in Tables 9 and 10.

TABLE 9
[Added at the 3rd day of the final instar]

| Test compounds | Amount of addition, γ/1 g. feedstuff | Number of silkworms tested | Mounting number after— | |
|---|---|---|---|---|
| | | | 12 hours | 20 hours |
| No addition | 0 | 60 | 0 | 0 |
| A | 5 | 60 | 0 | 0 |
| A | 20 | 60 | 0 | ¹0 |
| B | 5 | 60 | 0 | 0 |
| B | 20 | 60 | 0 | ¹0 |

¹ About 20 to 30 percent of the silkworms were dead afterwards.

TABLE 10
[Added at the 4th day of the final instar]

| Test compounds | Amount of addition, γ/1 g. feedstuff | Number of silkworms tested | Mounting number after— | |
|---|---|---|---|---|
| | | | 12 hours | 20 hours |
| No addition | 0 | 60 | 0 | 0 |
| A | 5 | 60 | 33 | 56 |
| A | 20 | 60 | 47 | 69 |
| B | 5 | 60 | 28 | 55 |
| B | 20 | 60 | 45 | 59 |

EXAMPLE 9

The experiments in part I are carried out by adopting as basal stuffs various artificial feedstuffs shown in Part II.

Part I.—Effect of claimed compounds on simultaneous mounting of silkworms

Experiment 1

2γ of 2β,3β,14α, 20, 22,26-hexahydroxycholest-7-en-6-one and 3γ of 2β,3β,14α,20,22,25-hexahydroxycholest-7-en-6-one (totally 5γ) are added to 1 g. of artificial feedstuff A.

Thus obtained feedstuff is fed on silkworms, Bombyx mori L., (race: Gunko X Banri) on seventh day of the final instar.

The silkworms are observed to begin to mount in 17 hours, after feeding, and the time course is shown in Table 11 in comparison with the case of no addition.

TABLE 11

| Test | Number of silkworms test | Number of mounting worms after for— | | | | | | |
|---|---|---|---|---|---|---|---|---|
| | | 12 hrs. | 17 hrs. | 22 hrs. | 27 hrs. | 32 hrs. | 37 hrs. | 42 hrs |
| Addition | 300 | 0 | 45 | 150 | 216 | 252 | 288 | 300 |
| No addition (control) | 300 | 0 | 12 | 60 | 135 | 169 | 211 | 222 |

EXPERIMENT 2

4γ of 2β,3β,14α,20,22,26 - hexahydroxycholest-7-en-6-one and 6γ of 2β,3β,14α,20,22,25-hexahydroxycholest-7-en-6-one (totally 10γ) are added to 1 g. of artificial feedstuff B.

Thus obtained feedstuff is fed on silkworms, Bombyx mori L., (race; Gunko x Banri) on seventh day of the final instar.

The silkworms are observed to begin to mount in 17 hours, after feeding and the time course is shown in Table 12, in comparison with the case of no addition.

TABLE 12

| Test | Number of silkworms tested | Number of mounting worms after feeding for— | | | | | | |
|---|---|---|---|---|---|---|---|---|
| | | 12 hrs. | 17 hrs. | 22 hrs. | 27 hrs. | 32 hrs. | 37 hrs. | 42 hrs. |
| Addition | 300 | 0 | 52 | 181 | 258 | 282 | 297 | 300 |
| No addition (control) | 300 | 0 | 11 | 72 | 114 | 171 | 204 | 237 |

EXPERIMENT 3

2.5γ of 2β,3β,14α,20,22,25-hexahydroxycholest-7-en-6-one and 5γ of 2β,3β,14α,20,22-pentahydroxycholest-7-en-6-one (totally 7.5γ) are added to 1 g. of artificial feedstuff C.

Thus obtained feedstuff is fed on silkworms (race: Gunko x Hoshun) on 6th day of the final instar.

The silkworms are observed to begin to mount in 17 hours after feeding and the time course is shown in Table 13, in comparison with the case of no addition.

TABLE 13

| Test | Number of silkworms tested | Number of mounting worms after feeding for— | | | | | | |
|---|---|---|---|---|---|---|---|---|
| | | 12 hrs. | 17 hrs. | 22 hrs. | 27 hrs. | 32 hrs. | 37 hrs. | 42 hrs. |
| Addition | 300 | 0 | 28 | 91 | 235 | 264 | 287 | 299 |
| No addition (control) | 300 | 0 | 0 | 0 | 0 | 6 | 9 | 52 |

EXPERIMENT 4

2.5γ of 2β,3β,14α,20,22,25-hexahydroxycholest-7-en-6-one, and 7.5γ of 2β,3β,14α,20,22-pentahydroxycholest-7-en-6-one (totally 10γ) are added to 1 g. of artificial feedstuff D.

Thus obtained feedstuff is fed on silkworms (race; Gunko x Banri) on 6th day of the final instar.

The result is shown in Table 14, in comparison with the case of no addition.

TABLE 14

| Test | Number of silkworms tested | Number of mounting worms after feeding for— | | | | | |
|---|---|---|---|---|---|---|---|
| | | 12 hrs. | 17 hrs. | 22 hrs. | 27 hrs. | 32 hrs. | 37 hrs. |
| Addition | 300 | 0 | 30 | 138 | 266 | 285 | 293 |
| No addition (control) | 300 | 0 | 0 | 0 | 0 | 3 | 10 |

EXPERIMENT 5

5γ of 2β,3β,14α,20,22,25-hexahydroxycholest-7-en-6-one is added to 1 g. of artificial feedstuff E.

Thus obtained feedstuff is fed on silkworms (race; Gunko x Banri) on 7th day of the final instar.

The result is shown in Table 15, in comparison with the case of no addition.

TABLE 15

| Test | Number of silkworms tested | Number of mounting worms after feeding for— | | | | | | |
|---|---|---|---|---|---|---|---|---|
| | | 12 hrs. | 17 hrs. | 22 hrs. | 27 hrs. | 32 hrs. | 37 hrs. | 42 hrs. |
| Addition | 300 | 21 | 54 | 63 | 96 | 155 | 265 | 287 |
| No addition (control) | 300 | 26 | 30 | 38 | 49 | 66 | 93 | 140 |

EXPERIMENT 6

9γ of 2β,3β,14α,20,22-pentahydroxycholest-7-en-6-one tri acetate (M.P. 119–120° C.) is added to 1 g. of artificial feedstuff F.

Thus obtained feedstuff is fed on silkworms (race; Gunko x Banri) on 7th day of the final instar.

The result is shown in Table 16, in comparison with the case of no addition.

TABLE 16

| Test | Number of silkworms tested | Number of mounting worms after feeding for— | | | | | | |
|---|---|---|---|---|---|---|---|---|
| | | 12 hrs. | 17 hrs. | 22 hrs. | 27 hrs. | 32 hrs. | 37 hrs. | 42 hrs. |
| Addition | 300 | 11 | 66 | 151 | 243 | 276 | 298 | 300 |
| No addition (control) | 300 | 23 | 27 | 36 | 45 | 57 | 80 | 119 |

EXPERIMENT 7

5γ of 2β,3β,14α,20,22,26-hexahydroxycholest-7-en-6-one and 7γ of 2β,3β,14α,20,22,25-hexahydroxycholest-7-en-6-one (totally 12γ) are added to 1 g. of artificial feedstuff G.

Thus obtained feedstuff is fed on silkworms (race; Gunko x Banri) on 7th day of the final instar. The result is shown in Table 17 in comparison with the case of no addition.

TABLE 17

| Test | Number of silkworms tested | Number of mounting worms after feeding for— | | | | | | |
|---|---|---|---|---|---|---|---|---|
| | | 12 hrs. | 17 hrs. | 22 hrs. | 27 hrs. | 32 hrs. | 37 hrs. | 42 hrs. |
| Addition | 298 | 23 | 69 | 153 | 242 | 278 | 287 | 296 |
| No addition (control) | 300 | 21 | 28 | 35 | 44 | 66 | 101 | 135 |

EXPERIMENT 8

2β,3β,14α,20,22 - pentahydroxycholest-7-en-6-one (1) and mixtures of 2β,3β,14α,20,22,26-hexahydroxycholest-7-en-6-one and 2β,3β,14α,20,22,25 - hexahydroxycholest-7-en-6-one (2)(3) and (4) are added to artificial feedstuff H and I, respectively.

Thus obtained feedstuff are fed on silkworms (race; C131 x N131) on 7th day of the final instar.

The time course of mounting is shown in Table 18 and Table 19, respectively.

TABLE 18

| | Amount of addition γ/1 g. feedstuff H | Number of silkworms tested | Number of mounting worms after feeding for— | | | |
|---|---|---|---|---|---|---|
| | | | 11 hrs. | 15 hrs. | 19 hrs. | 23 hrs. |
| Control | 0 | 100 | 0 | 3 | 21 | 78 |
| (1) | 9 | 100 | 91 | 100 | | |
| (2) | [1] 5 | 100 | 61 | 90 | 98 | 100 |
| (3) | [2] 10 | 99 | 84 | 99 | | |
| (4) | [3] 20 | 100 | 100 | | | |

[1] 2.5γ each of the compounds.
[2] 5γ each of the two compounds.
[3] 10γ each of the two compounds.

TABLE 19

| | Amount of addition γ/1 g. feedstuff H | Number of silkworms tested | Number of matured worms after feeding for— | | | |
|---|---|---|---|---|---|---|
| | | | 11 hrs. | 15 hr. | 21 hrs. | 78 hrs. |
| Control | 0 | 100 | 0 | 5 | 22 | 67 |
| (1) | 9 | 100 | 85 | 100 | | |
| (2) | [1] 5 | 100 | 74 | 92 | 99 | 100 |
| (3) | [2] 10 | 100 | 95 | 100 | | |
| (4) | [3] 20 | 100 | 100 | | | |

[1] 2.5γ each of the two compounds.
[2] 5γ each of the two compounds.
[3] 10γ each of the two compounds.

EXPERIMENT 9

The compounds of the present invention are, solely or in combination, added to artificial feedstuff J. Thus obtained feedstuffs are fed on silkworms (race; C131 x N131) on 7th day of the final instar. The time course of mounting, as shown in Table 20, demonstrates a comparison between the case wherein the compounds of the present invention are added as opposed to the case wherein such compounds are not added.

TABLE 20

| Test [1] | Number of silkworms tested | Number of matured worms after feeding for— | | | |
|---|---|---|---|---|---|
| | | 9 hrs. | 12 hrs. | 15 hrs. | 18 hrs. |
| Control (no addition) | 100 | 21 | 22 | 33 | 62 |
| Addition [1] | 100 | 25 | 36 | 86 | 98 |
| Do.[2] | 100 | 25 | 46 | 90 | 99 |
| Do.[3] | 100 | 25 | 57 | 100 | |
| Do.[4] | 100 | 26 | 63 | 100 | |

[1] Of 5γ of 2β,3β,14α,20,22-pentahydroxycholest-7-en-6-one per 1 g. of feedstuff J.
[2] Of 5γ each of 2β,3β,14α,20,22-pentahydroxycholest-7-en-6-one and 2β,3β,14α,20,25-pentahydroxycholest-7-en-6-one (totally 10γ) per 1 g. of feedstuff J.
[3] Of 5γ each of 2β,3β,14α,20,22-pentahydroxycholest-7-en-6-one; 2β,3β,14α,20,25 - pentahydroxycholest-7-en-6-one and 2β,3β,14α,20,22,25-hexahydroxycholest-7-en-6-one (totally 15γ) per 1 g. of feedstuff J.
[4] Of 2.5γ each of 2β,3β,14α,20,22-pentahydroxycholest-7-en-6-one; 2α,3α,14α,20,22-pentahydroxycholest-7-en-6-one; 2β,3β,14α,20,22,24-hexahydroxycholest-7-en-6-one; 2β,3β,14α,22,25-pentahydroxycholest-7-en-6-one; 2β,3β,14α,20,22,25 - hexahydroxycholest-7-en-6-one; 2β,3β,14α,20,22,26 - hexahydroxycholest-7-en-6-one and 2β,3β,14α,20,22,25,26-heptahydroxycholest-7-en-6-one (totally 17.5γ) per 1 g. of feedstuff J.

EXPERIMENT 10

Various amounts of 2α, 3α, 14α, 20, 22, 24-hexahydroxycholest-7-en-6-one are added to feedstuff J. Thus obtained feedstuff is fed on silkworms (race; Gunko x Banri) on 6th day of the final instar.

The time course of mounting is shown in Table 21.

TABLE 21

| Test | Amount of addition, γ/1 g. feedstuff K. | Number of silkworms tested | Number of mounting worms after feeding for— | | | | |
|---|---|---|---|---|---|---|---|
| | | | 14 hrs. | 24 hrs. | 28 hrs. | 32 hrs. | 36 hrs. |
| Control | 0 | 300 | 3 | 5 | 18 | 32 | 14 |
| A | 6 | 300 | 34 | 168 | 211 | 255 | 280 |
| B | 9 | 300 | 47 | 231 | 256 | 284 | 293 |
| C | 12 | 300 | 122 | 259 | 275 | 294 | 300 |

Part II.—Some examples of artificial silkworm feedstuff

Artificial feedstuff A:                            Parts by weight
  Mulberry leaf powder _____ 20.0
  Defatted soy bean meal _____ 35.0
  Cellulose powder _____ 15.0
  Potato starch _____ 15.0
  $\beta$-sitosterol _____ 0.5
  Sucrose _____ 10.0
  Vitamin C _____ 1.0
  Inositol _____ 0.5
  Dipotassium hydrogen phosphate _____ 0.5
  Choline chloride _____ 0.05
  Dihydro streptomycin _____ 0.1
  Water, 1.6 times as much by volume as other components.

Artificial feedstuff B:
  Mulberry leaf powder _____ 20.0
  Soy bean meal _____ 45.0
  Cellulose powder _____ 15.0
  Corn starch _____ 15.0
  Sucrose _____ 6.0
  Vitamin C _____ 1.0
  Dipotassium hydrogen phosphate _____ 0.5
  Dihydro streptomycin _____ 0.1
  Water, 1.8 times as much by volume as other components.

Artificial feedstuff C:
  Mulberry leaf powder _____ 16.0
  Defatted soy bean meal _____ 65.0
  Cellulose powder _____ 8.0
  Potato starch _____ 10.0
  $\beta$-sitosterol _____ 0.3
  Wesson's mixture _____ Trace
  Sucrose _____ 10.0
  Vitamin mixture _____ Trace
  Vitamin C _____ 1.0
  Inositol _____ 0.5
  Dipotassium hydrogen phosphate _____ 0.5
  Choline chloride _____ 0.05
  Potassium sorbate _____ 0.1
  Citric acid _____ 0.1
  Water, 2.0 times as much by volume as other components.

Artificial feedstuff D:
  Mulberry leaf powder _____ 20.0
  Soy bean meal _____ 45.0
  Cellulose powder _____ 15.0
  Corn starch _____ 15.0
  $\beta$-sitosterol _____ 0.2
  Glucose _____ 5.0
  Vitamin C _____ 1.5
  Dipotassium hydrogen phosphate _____ 0.5
  Dihydro streptomycin _____ 0.1
  Water, 1.8 times as much by volume as other components.

Artificial feedstuff E:
  Mulberry leaf powder _____ 20.0
  Soy bean casein _____ 15.0
  Cellulose _____ 40.0
  $\beta$-sitosterol _____ 0.5
  Agar _____ 4.0
  Vitamin mixture _____ Trace
  Sucrose _____ 10.0
  Vitamin C _____ 1.0
  Inositol _____ 0.6
  Dipotassium hydrogen phosphate _____ 0.4
  Choline chloride _____ 0.05
  Chloramphenicol _____ 0.1
  Leucomycin _____ 0.1
  Water, 1.6 times as much by volume as other components.

Artificial feedstuff F:
  Mulberry leaf powder _____ 20.0
  Brewer's yeast _____ 10.0
  Defatted soy bean meal _____ 35.0
  Cellulose _____ 15.0
  Potato starch _____ 15.0
  Cotton seed oil _____ 4.0
  $\beta$-sitosterol _____ 0.3
  Campesterol _____ 0.2
  Agar _____ 4.0
  Sucrose _____ 10.0
  Vitamin C _____ 1.5
  Dipotassium hydrogen phosphate _____ 0.5
  Sodium sorbate _____ 0.1
  Citric acid _____ 0.1
  Water, 1.8 times as much by volume as other components.

Artificial feedstuff G:
  Mulberry leaf powder _____ 50.0
  Soy bean meal _____ 15.0
  Cellulose powder _____ 15.0
  Potato starch _____ 10.0
  $\beta$-sitosterol _____ 0.5
  Agar _____ 4.0
  Sucrose _____ 3.0
  Vitamin C _____ 1.0
  Dipotassium hydrogen phosphate _____ 0.15
  Sodium sorbate _____ 0.15
  Citric acid _____ 0.15
  Water, 2.0 times as much by volume as other components.

Artificial feedstuff H:
  Mulberry leaf powder _____ 50.0
  Brewer's yeast _____ 5.0
  Soy bean meal _____ 10.0
  Corn starch _____ 10.0
  Stigmasterol _____ 0.2
  Carboxymethyl cellulose _____ 4.0
  Sucrose _____ 3.0
  Vitamin C _____ 1.0
  Dipotassium hydrogen phosphate _____ 0.5
  Sodium sorbate _____ 0.15
  Citric acid _____ 0.15
  Water, 2.0 times as much by volume as other components.

Artificial feedstuff I:
  Mulberry leaf powder _____ 20.0
  Alfalfa meal _____ 5.0
  Defatted soy bean meal _____ 40.0
  Rice flour _____ 5.0
  Cellulose powder _____ 10.0
  Corn starch _____ 10.0
  Oleic acid _____ 1.5
  Soy bean sterol _____ 0.5
  Carboxymethyl cellulose _____ 4.0
  Vitamin mixture _____ Trace
  Sucrose _____ 3.0
  Vitamin C _____ 1.0
  Leucomycin _____ 0.1
  Potassium sorbate _____ 0.1
  Water, 1.8 times as much by volume as other components.

Artificial feedstuff J:
  Defatted soy bean meal _____ 50.0
  Wheat meal _____ 5.0
  Potato starch _____ 10.0
  Cellulose powder _____ 15.0
  Soy bean oil _____ 3.0

What is claimed is:

1. A method for inducing simultaneous mounting of silkworms, which comprises orally feeding silkworms not earlier than the fourth day of the final instar an effective amount of a member selected from the group consisting of a compound of the formula

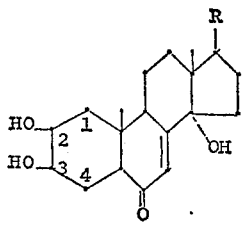

wherein the two hydroxyls at positions 2 and 3 are α- or β-oriented, and R is 1,5-dimethylhexyl having 2 to 4 hydroxyl groups, and mixtures of the said compounds in an amount of from about 5 to about 20 gammas per gram of an artificial silkworm feedstuff fed to said silkworms, said amount being determined on a dry basis.

2. A method according to claim 1, wherein the said compound is 2β,3β,14α, 20,22-pentahydroxycholest-7-en-6-one.

3. A method according to claim 1, wherein the said compound is 2α,3α,14α,20,22-pentahydroxycholest-7-en-6-one.

4. A method acording to claim 1, wherein the said compound is 2β,3β,14α,20,22,24-hexahydroxycholest-7-en-6-one.

5. A method according to claim 1, wherein the said compound is 2β,3β,14α,22,25-pentahydroxycholest-7-en-6-one.

6. A method according to claim 1, wherein the said compound is 2β,3β,14α,20,22,25-hexahydroxycholest-7-en-6-one.

7. A method according to claim 1, wherein the said compound is 2β,3β,14α,20,22,26-hexahydroxycholest-7-en-6-one.

8. A method according to claim 1, wherein the said compound is 2β,3β,14α,20,22,25,26-heptahydroxycholest-7-en-6-one.

9. A silkworm feeding composition which consists essentially of an artificial silkworm feedstuff and which contains an effective amount of a member selected from the group consisting of a compound of the formula

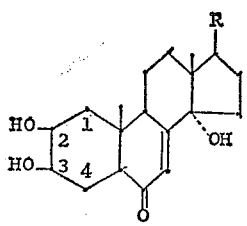

wherein the two hydroxyls at positions 2 and 3 are α- or β-oriented, and R is 1,5-dimethylhexyl having 2 to 4 hydroxyl groups, and mixtures of said compounds, in an amount of from about 5 to about 20 gammas per gram of the silkworm feedstuff, on the dry basis.

10. A silkworm feeding composition according to claim 9, wherein the said compound is 2β,3β,14α,20,22-pentahydroxycholest-7-en-6-one.

11. A silkworm feeding composition according to claim 9, wherein the said compound is 2β,3β,14α,20,22-pentahydroxycholest-7-en-6-one.

12. A silkworm feeding composition according to claim 9, wherein the said compound is 2β,3β,14α,20,22,24-hexahydroxycholest-7-en-6-one.

13. A silkworm feeding composition according to claim 9, wherein the said compound is 2β,3β,14α,22,25-pentahydroxycholest-7-en-6-one.

14. A silkworm feeding composition according to claim 9, wherein the said compound is 2β,3β,14α,20,22,25-hexahydroxycholest-7-en-6-one.

15. A silkworm feeding composition according to claim 9, wherein the said compound is 2β,3β,14α,20,22,26-hexahydroxycholest-7-en-6-one.

16. A silkworm feeding composition according to claim 9, wherein the said compound is 2β,3β,14α,20,22,25,26-heptahydroxycholest-7-en-6-one.

References Cited
UNITED STATES PATENTS 3,442,917   5/1969   Wiechert et al. ----- 260—397.2
3,295,983   1/1967   Kato et al. ------------- 99—2

ALBERT T. MEYERS, Primary Examiner

V. D. TURNER, Assistant Examiner

U.S. Cl. X.R.

424—242

UNITED STATES PATENT OFFICE
CERTIFICATE OF CORRECTION

Patent No. 3,709,990                    Dated  January 9, 1973

Inventor(s) Masaki Kamada and Tetsuo Okauchi

It is certified that error appears in the above-identified patent and that said Letters Patent are hereby corrected as shown below:

Page one, first column, below the line reading "Ser. No. 38,897", insert the following:

-- Claims priority, Japan   applications nos. 79939/66, December 6, 1966, 81174/66, December 10, 1966, 868/67, December 28, 1966 and 41869/67, June 28, 1967 --.

Signed and sealed this 5th day of March 1974.

(SEAL)
Attest:

EDWARD M. FLETCHER, JR.                C. MARSHALL DANN
Attesting Officer                      Commissioner of Patents